United States Patent [19]
Fliesser

[11] 3,791,566
[45] Feb. 12, 1974

[54] INTERMITTENT FOR CINEMATOGRAPHIC APPARATUS

[75] Inventor: Engelbert Fliesser, Munich, Germany

[73] Assignee: Agfa-Gevaert AG, Munich, Germany

[22] Filed: Dec. 7, 1971

[21] Appl. No.: 205,622

[30] Foreign Application Priority Data
Dec. 8, 1970 Germany.................. P 20 60 221.5

[52] U.S. Cl...................... 226/68, 226/71, 352/196
[51] Int. Cl.............................................. G03b 1/22
[58] Field of Search....... 226/62, 68, 73, 67, 64, 65, 226/71, 198; 352/191, 194, 195, 196

[56] References Cited
UNITED STATES PATENTS
3,643,842  2/1972  Maaden............................... 226/71
2,463,043  3/1949  McClay............................. 226/73 X
3,572,918  3/1971  Steisslinger...................... 226/198 X Primary Examiner—Allen N. Knowles
Assistant Examiner—Gene A. Church
Attorney, Agent, or Firm—Michael S. Striker

[57] ABSTRACT

An intermittent for transporting film in motion picture cameras or projectors wherein the movements of the claw of the pull-down into and out of the film plane are effected by an electromagnet and the up and down movements of the claw are effected by the moving coil of an electrical instrument. The supply and takeup reels are rotatable in directions to collect the film by discrete variable-speed d-c motors.

5 Claims, 2 Drawing Figures

PATENTED FEB 12 1974   3,791,566

INVENTOR
ENGELBERT FLIESSER

3,791,566

INTERMITTENT FOR CINEMATOGRAPHIC APPARATUS

BACKGROUND OF THE INVENTION

The present invention relates to cinematographic apparatus in general, and more particularly to improvements in mechanisms which can be utilized in motion picture cameras or motion picture projectors to transport perforated motion picture film in stepwise fashion so as to place successive film frames into register with the optical system prior to exposure of such frames to scene light in a camera or prior to projection of images of such frames onto a screen or the like. Such mechanisms, also known as intermittents or camera movements, normally employ a feeding element in the form of a pull-down having a claw which can be caused to enter into and to be withdrawn from the adjoining perforation of the film. In addition, the pull-down is movable lengthwise of the film so that, when the pull-down moves in a first direction while the claw extends into the adjoining perforation, the film is compelled to share its movement. On the other hand, when the claw is withdrawn and the pull-down moves in the opposite direction, the claw can be moved to a starting position in which it registers with a fresh perforation for renewed transport of film by the length of a frame.

It is already known to employ in an intermittent an electromechanical device which imparts to the pull-down the so-called up and down movements in the longitudinal direction of the adjacent portion of motion picture film. Such intermittents employ purely mechanical devices for effecting the movements of clay in and out of the film plane. It is also known to provide an intermittent with an electromechanical device which imparts to the claw all necessary in and out movements and with a mechanical device for effecting the up and down movements of the pull-down. As a rule, the mechanical devices rely on cam and follower drives.

A drawback of mechanical devices which effect in and out or up and down movements of the claw is that the respective movements require more time than desirable in many types of cinematographic apparatus. Moreover, the mechanical devices are noisy and the wear on their parts is considerable so that the accuracy of positioning of successive film frames diminishes with progressing wear. Accurate registering of film frames with the aperture and holding of motion picture film against movement during picture taking are important factors which greatly influence the quality of exposures.

SUMMARY OF THE INVENTION

An object of the invention is to provide a novel and improved mechanism for stepwise transport of motion picture film in cinematographic apparatus which is capable of effecting the in and out as well as up and down movements of a pull-down or an analogous feeding element with a high degree of accuracy and reproducibility, which is subjected to less wear than presently known mechanisms, which can reduce the length of time required for accurate positioning of successive film frames in register with the optical system of a motion picture projector or motion picture camera, and whose energy requirements are extremely low so that it can be used with advantage in compact motion picture cameras.

Another object of the invention is to provide a mechanism for stepwise transport of motion picture film which occupies little room, which enables the operator to wind the film onto the supply reel or takeup reel at one or more speeds and without any interference on the part of the pull-down, which can be used to transport the film at two or more different frequencies, which can allow for rapid selection of a particular film frame in a motion picture projector, and which can be used with advantage in projectors wherein the film frames are transported rearwardly at a speed which is sufficiently low to permit the observation of images during winding onto the supply reel.

The invention is embodied in a cinematographic apparatus for use with perforated motion picture film which is arranged to move along a predetermined path between a rotary supply device and a rotary takeup device, and more particularly, in an improved mechanism for transporting the film stepwise along the path. The mechanism, also called intermittent, comprises a film feeder in the form of a pull-down which is adjacent to a predetermined portion of the film path and is arranged to perform first movements (preferably substantially at right angles to the adjacent portion of the film path) to thereby introduce its claw means into and to withdraw the claw means from the adjoining perforation of the film and second movements of predetermined length lengthwise of the adjacent portion of the film path so that the film is transported lengthwise when the pull-down moves in a first direction while its claw means extends into the adjoining perforation and that the pull-down moves relative to the film while moving in a second direction counter to the first direction with the claw means disengaged from the film, first electrically operated means (e.g., an electromagnet) for imparting to the pull-down the first movements and second electrically operated moving means (e.g., an instrument having a moving coil which is coupled to the pull-down by a crank drive or the like) for imparting to the pull-down the second movements.

The mechanism preferably further comprises elongated guide means about the axis of which the pull-down pivots to perform its first movements and along which the pull-down moves to perform its second movements.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
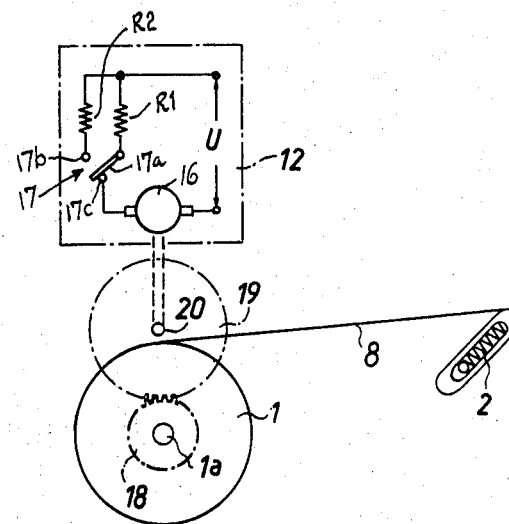
FIG. 1 is a diagrammatic side elevational view of a portion of a cinematographic apparatus whose intermittent is constructed in accordance with the invention.
Figure 1:
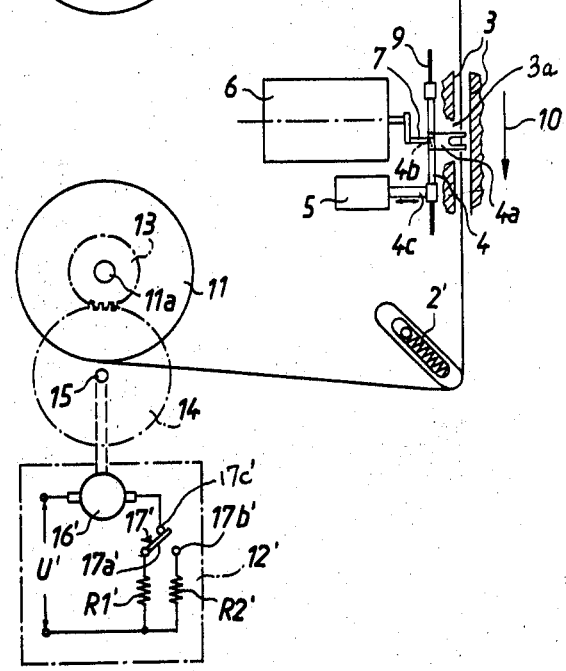

Referring to the drawing in detail, there is shown a portion of a cinematographic apparatus, for example, a motion picture camera, which comprises a supply reel 1 and a takeup reel 11. The ends of a strip of perforated motion picture film 8 are respectively connected with the cores of the reels 1 and 11 in a manner not forming part of the invention. The supply reel 1 is rotatable on a shaft 1a and is provided with or coupled to a gear 18 which meshes with a second gear 19 mounted on a shaft 20 driven by a variable-speed d-c motor 16. The takeup reel 11 is rotatable on a shaft 11a and is provided with or connected to a gear 13 in mesh with a gear 14 on a shaft 15. The shaft 15 is driven by a second variable-speed d-c motor 16'.

That length of the film 8 which is not convoluted around the cores of the reels 1 and 11 extends along a predetermined path which is defined in part by two spring-biased deflecting or compensating devices 2,2' and a film channel 3 disposed between the two compensating devices. In accordance with a feature of the invention, the intermittent of the motion picture camera comprises a feeder or pull-down 4 which is slidably and pivotably mounted on a guide rod 9 and has a claw 4a which can enter into and be withdrawn from the adjoining perforations of the film 8 in the region of the channel 3. The latter is provided with an opening or window 3a through which the claw 4a can extend in response to pivoting of the pull-down 4 about the axis of the guide rod 9. The latter is parallel to that portion of the film path which is defined by the channel 3. The direction in which the film 8 is normally transported in stepwise fashion when the claw 4a extends into the adjoining perforation and the pull-down 4 is caused to move along the guide rod 9 is indicated by the arrow 10. The moving means for effecting up-and-down movements of the pull-down 4, i.e., in a counter to the direction indicated by the arrow 10, comprises an electrical moving-coil instrument 6 whose coil can rotate a drive including a crank pin 7 extending into a horizontal slot 4b of the pull-down. As shown in FIG. 2, the slot 4b is substantially normal to the guide rod 9 and to the direction of film transport in the channel 3. The moving means for effecting movements of the claw 4a in and out of the film plane comprises an electromagnet 5 having an armature 4c which is rigid or integral with the pull-down 4 and is caused to pivot the latter in a direction to introduce the claw 4a into the adjoining perforation of the film 8 when the electromagnet 5 is energized. A suitable spring, not shown, is provided to pivot the pull-down 4 in the opposite direction when the electromagnet 5 is deenergized so that the claw 4a is then automatically withdrawn from the registering perforation and the pull-down 4 can perform a return stroke (upwardly as viewed in FIGS. 1 or 2) while the claw 4a remains disengaged from the film. The crank pin 7 preferably effects the upward as well as the downward movements of the pull-down 4.

Figure 2:
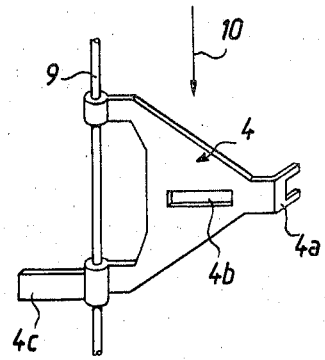
FIG. 2 is an enlarged perspective view of the pull-down which forms part of the improved intermittent.

The operation of the intermittent is as follows:

FIG. 1 illustrates the pull-down 4 in its lower end position. The electromagnet 5 is assumed to be energized so that the armature 4c causes the claw 4a to extend into the adjacent perforation. The film 8 has completed a step in a direction from the supply reel 1 toward the takeup reel 11. Before the pull-down 4 can return to its upper end position, the electromagnet 5 must be deenergized so that the aforementioned spring is then free to expel the claw 4a from the registering perforation of the film. Once the electromagnet 5 is deenergized, the coil of the instrument 6 causes the crank pin 7 to travel along an arc of 180° whereby the pin 7 slides in the slot 4b and lifts the pull-down 4 in a direction counter to that indicated by the arrow 10. The claw 4a is thereby moved into register with a selected perforation of the film 8 and can enter such perforation in response to renewed energization of the electromagnet 5 which causes the entire pull-down 4 to pivot about the axis of the guide rod 9. The coil of the instrument 6 is energized again and causes the pin 7 to turn through 180° so that the pull-down 4 moves in the direction indicated by the arrow 10 through a distance corresponding to that between the centers of two successive film frames. In order to insure accurate positioning of successive film frames in register with the lens system of the cinematographic apparatus, the crank pin 7 is preferably arrested in its upper and lower dead-center positions. The electromagnet 5 is deenergized when the pull-down 4 reaches its lower end position (in the lower dead-center position of the crank pin 7) so that the claw 4a is withdrawn from the adjacent perforation and the pull-down 4 can return to its upper end position (corresponding to the upper dead-center position of the crank pin 7) in response to renewed energization of the coil in the instrument 6. If desired, the instrument 6 can be designed in such a way that the crank pin 7 is caused to travel along an arc of 180° in response to energization of the coil and thereupon through an arc of 180° under the bias of one or more springs, not shown. The simplest way is to reverse the direction of current flow through the coil and to thus use the coil as a means for moving the pull-down up and down. The claw 4a is always disengaged from the film 8 when the pull-down is caused to move counter to the direction indicated by the arrow 10, provided that the user of the cinematographic apparatus wishes to transport the film 8 stepwise from the core of the supply reel 1 toward the core of the takeup reel 11. If the film 8 is to be rapidly rewound onto the core of the reel 1 or 11, the electromagnet 5 is deenergized and the circuit of the instrument 6 is opened so that the pull-down 4 cannot interfere with rapid rotation of the reel 1 in a counterclockwise direction, as viewed in FIG. 1 (to collect the film on the core of the reel 1) or with rapid rotation of the takeup reel 11 in a clockwise direction (in order to rapidly collect the film on the core of the reel 11). Also, at least one of the front and rear portions of the channel 3 (to the right and to the left of the vertical portion of the film 8, as viewed in FIG. 1) is preferably movable away from the other channel portion when the film is to be rapidly collected by the reel 11 or 1 so that the channel 3 then offers minimal resistance to rapid transport of the film in or counter to the direction indicated by the arrow 10.

The instrument 6 and the electromagnet 5 are preferably controlled by a system which employs electronic switches actuated by a rotary shutter of the cinematographic apparatus or by photosensitive control elements. Thus, a rotary shutter can complete the circuit of the instrument 6 to move the pull-down 4 upwardly while the electromagnet 5 is deenergized and while the shutter admits scene light to the foremost unexposed film frame in a motion picture camera; the shutter thereupon reverses the current flow in the coil of the instrument 6 and energizes the electromagnet 5 while the shutter overlies the light-admitting aperture of the camera to prevent the admission of scene light when the claw 4a advances the film 8 by the length of a frame; and the shutter thereupon again reverses the direction of current flow in the coil of the instrument 6 and deenergizes the electromagnet 5 while the foremost unexposed film frame receives scene light and while the claw 4a returns to its upper end position as viewed in FIG. 1. If the shutter is driven by a motor which can be operated at several speeds, the shutter will cause the pull-down 4 to advance the film 8 by a larger or smaller number of steps per unit of time. The exact nature of controls for the instrument 6 and electromagnet 5 forms no part of the present invention.

Since all movements of the pull-down 4 are initiated by electrically operated moving means, the mechanical devices (such as in-and-out cams and followers) can be fully dispensed with. This reduces the length of intervals which are required for moving the claw 4a into or out of an adjoining perforation or for moving the pull-down in and counter to the direction indicated by the arrow. The inertia of mechanical moving means would not permit such rapid in and out or up and down movements of the pull-down. The mass of parts which move in response to energization of the coil in the instrument 6 or in response to energization of the electromagnet 5 is minimal. The spring-biased compensating devices 2 and 2' reduce the likelihood of excessive tensioning of the film 8 in response to stepwise in or counter to the direction indicated by the arrow 10. If desired, the number of such compensating devices can be increased to three, four or more.

The d-c motor 16 forms part of a drive means 12 which can rotate the supply reel 1 at several speeds in a direction to collect the film 8 on the core of the reel 1. The drive means 12 further comprises an energy source U for the motor 16 and a speed-changing device including a switch 17 and two resistors R1, R2 having different resistances. When the movable contact 17a of the switch 17 engages the fixed contact 17c (as shown in FIG. 1), the circuit of the motor 16 is completed by way of the energy source U and resistor R1 whereby the motor 16 drives the supply reel 1 at a first speed. The reel 1 will be driven at a different second speed when the movable contact 17a is caused to engage the fixed contact 17b of the switch 17 so that the circuit of the motor 16 is completed by way of the energy source U and the resistor R2. The corresponding components of the drive means 12' for the takeup reel 11 are denoted by similar reference characters each followed by a prime. If the resistance of the resistors R1 and R1' respectively exceeds the resistance of the resistors R2 and R2', the motors 16, 16' will rotate the reels 1, 11 at a lower speed when the movable contacts 17a, 17a' of the switches 17, 17' assume the positions shown in FIG. 1. It is clear that, if desired, the drive means 12 and/or 12' may be modified to enable the motor 16 or 16' to rotate the respective reel at three or more different speeds.

It is further within the purview of the invention to provide the cinematographic apparatus with a single motor for the reels 1 and 11. The operative connections between such single motor and the reels 1, 11 then comprise friction clutches which can be engaged or disengaged depending upon whether the single motor is to rotate the reel 1 or 11. The single motor can be a variable-speed motor. Alternatively, the connection between the single motor and each of the reels 1, 11 may comprise a friction clutch which can transmit to the respective reel a limited torque to rotate the reel at a relatively low speed and a rigid connection without a friction clutch which can rotate the respective reel at a full speed. Thus, a single motor which can rotate at a single speed can be used to rotate each of the reels 1, 11 at several speeds. The drive means 12, 12' shown in FIG. 1 are preferred at this time because they need not employ friction clutches and because the speed of the motor 16, 16' can be varied in a very simple way, merely by changing the voltage in the circuit of the respective motor. Thus, as the voltage increases, the output of the respective motor 16 or 16' also increases and the reel 1 or 11 is rotated at a higher speed.

The improved intermittent mechanism can be used in cinematographic apparatus to intermittently transport the film 8 at two or more frequencies in a manner as described above in connection with the variable-speed drive means for the shutter. Also, the film 8 can be rapidly transported forwardly by the motor 16' to enable the operator of a projector to rapidly locate a particular film frame or a particular series of film frames. The motor 16 can rapidly rewind the film 8 in a motion picture projector so that the operator can repeatedly project the images of a selected number of frames. Furthermore, the entire film can be rapidly rewound on the supply reel 1 by operating the motor 16 at the higher or highest speed, or collected by the takeup reel 11 by operating the motor 16' at the higher or highest speed. Still further, the pull-down 4 can transport the film forwardly or rearwardly in stepwise fashion; for example, the rearward transport can be effected at such a speed that the images of successive frames of an exposed and developed film can be observed during rearward transport, either by the pull-down 4 or by the motor 16 (when the latter is operated at the lower or lowest speed).

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus for use with perforated motion picture film which is arranged to move along a predetermined path, a mechanism for transporting the film stepwise along said path comprising a pull-down adjacent to a portion of said path and having claw means, elongated guide means for said pull-down having an axis extending in substantial parallelism with said portion of said path, said pull-down being pivotable about said axis to thereby perform first movements substantially at right angles to said portion of said path and to thereby introduce said claw means into and to withdraw said claw means from the adjoining perforation of the film in said path, said pull-down being further movable lengthwise of said guide means to thereby perform second movements lengthwise of said path so that the film is transported lengthwise when said pull-down moves in a first direction while said claw means extends into the adjoining perforation and said pull-down moves relative to the film while moving in a second direction counter to said first direction with said claw means disengaged from the film; first electrically operated moving means for imparting to said pull-down said first movements; and second electrically operated moving means for imparting to said pull-down said second movements.

2. A mechanism as defined in claim 1, further comprising yieldable compensating means for guiding the film in second and third portions of said path, said first mentioned portion of said path being disposed between said second and third portions.

3. A mechanism as defined in claim 1, further comprising a rotary takeup device connected with the film at one end of said path, a rotary supply device connected with the film at the other end of said path, and drive means actuatable to rotate said devices in directions to collect the film.

4. A mechanism as defined in claim 1, wherein said first moving means includes electromagnet means for imparting to said pull-down said first movements, said second moving means including a moving coil instrument for imparting to said pull-down said second movements.

5. A mechanism as defined in claim 4, wherein said second moving means further comprises a crank drive coupling the moving coil of said instrument with said pull-down.

* * * * *